United States Patent [19]

Bennett

[11] 3,771,880

[45] Nov. 13, 1973

[54] ROUGHNESS ANALYZER

[75] Inventor: Harold E. Bennett, China Lake, Calif.

[73] Assignee: The United States of America as represented by the Secretary of the Navy.

[22] Filed: Sept. 29, 1971

[21] Appl. No.: 184,752

[52] U.S. Cl. .............................. 356/209, 356/212
[51] Int. Cl. .......................................... G01n 21/48
[58] Field of Search.................. 356/209, 210, 212, 356/103, 104

[56] References Cited
UNITED STATES PATENTS

| | | | |
|---|---|---|---|
| 3,229,564 | 1/1966 | Meltzer................................ | 356/210 |
| 2,315,282 | 3/1943 | Snow.................................... | 356/210 |
| 3,591,291 | 7/1971 | Greer.................................... | 356/209 |
| 3,508,830 | 4/1970 | Hopkins et al...................... | 356/103 |
| 3,310,680 | 3/1967 | Hasegawr............................. | 356/104 |

Primary Examiner—David Schonberg
Assistant Examiner—Conrad Clark
Attorney—R. Sciascia et al.

[57] ABSTRACT

A device for measuring surface irregularities of an optical surface. A light source strikes the surface to be tested and is both specularly reflected and scattered outside the specular direction. A reflecting cone directs some of that light outside the specular direction to a measuring device. Some of the scattered light falls on the device without striking the cone, as does the specularly reflected light. Thus the fraction of the reflected light which is within a given angle of the specular direction may be measured. Alternatively a light source passes through a hole in the back of a Coblentz sphere. Light within the specular direction returns through the hole and is measured with a light measuring device while light scattered without the specular direction is measured by a second light measuring device.

2 Claims, 2 Drawing Figures

ROUGHNESS ANALYZER

BACKGROUND OF THE INVENTION

This invention pertains to devices for measuring the light scattered from very smooth optical surfaces.

Because the surface irregularities of an optical surface are always much smaller than the wavelength of the incident light, one must use diffraction theory to describe optical scattering.

Other contributions to scattered light may arise from electron plasma effects or from thermal and quantum processes in the mirror coating, for example, surface plasmon absorption and reemission, Rayleigh scattering, Brillouin scattering, Raman scattering, etc.

If the exact shape and size of the irregularities is known, an exact calculation of the surface roughness can be made. This procedure has been used by several investigators but solutions have been obtained in only a few special cases. Alternatively the surface irregularities can be treated statistically and their average contribution determined. This latter procedure was apparently first discussed by T. N. Chinmayandam [Phys. Rev. 13, 96 (1919)]. The resulting expressions have been rediscovered several times. See H. Davies [Proc. Inst. Elec. Engrs. (London) 101, 209 (1954)] and its generalization by J. O. Porteus [J. Opt. Soc. Am. 53, 1394 (1963)]. See also H. E. Bennett and J. O. Porteus [J. Opt. Soc. Am. 51, 123 (1961)]. The resulting expression for the case in which the height distribution and autocovariance function of the surface irregularities are both Gaussian is:

$$\frac{R}{R_0} = e^{-(4\pi\delta/\lambda)^2} + [1 - e^{-(4\pi\delta/\lambda)^2}][1 - e^{-(\pi a\alpha/\lambda)^2}] \quad (1)$$

Here $\delta$ is the rms roughness, $a$ the autocovariance length, $\lambda$ the wavelength, $\alpha$ the semiacceptance angle about the specular direction, and $R/R_0$ the fraction of the reflected light which is within an angle of the specular direction. It is assumed that $\delta/\lambda << 1$, and $a/\lambda << 1$, also that $\alpha$ is a small angle. Note that these assumptions do not imply that the rms slope $m$, given by $m = \sqrt{2}\,\delta/a$ is small or that the surface must be gently rolling. The first exponential gives the fraction of the reflected light which is specularly or coherently reflected, the first bracket that scattered, and the second bracket the fraction of the scattered light which is directed within an angle $\alpha$ of the specular direction.

There are several points to be noted about the expression given in equation 1. (1) The total amount of scattered light is proportional to $(\delta/\lambda)^2$. Hence the amount of scattered light should decrease strongly as the wavelength increases. (2) Light scattered near the specular direction should decrease even more rapidly as the wavelength increases. Expansion of the general equation and substitution of Eq. (1) shows the light scattered near the specular direction to be proportional to $(\delta/\lambda)^4$. (3) The acceptance angle about the specular direction has a strong influence. The scattered light is proportional to the square of the acceptance angle. (4) Light scattered near the specular direction is inversely proportional to the square of the rms slope $m$. Thus for gently rolling surfaces, scattered light near specular will be much larger than for jagged surfaces of the same roughness.

To minimize scattered light near the specular direction, one would then like to have (1) as small a surface roughness as possible, (2) as jagged a surface as possible, (3) as small an acceptance angle as possible, and (4) operation at as long a wavelength as possible. The amount of scattered light predicted for a surface having an autocovariance length of 10,900 A, a typical value for polished fused silica [I. J. Hodgkinson, J. Sci. Instr. 3, 341 (1970)], and roughnesses of 8 A (very smooth), 27 A (typical of many optical glass surfaces) and 84 A (typical of many polished metal surfaces) is given in Table I for light of wavelength $0.63\mu$ and $10.6\mu$. Both the total

TABLE I

[Theoretical scattered light at $0.6\mu$ and $10.6\mu$, assuming a=10,000 A.]

| Roughness, A. | Total scattered | | $\alpha=5°$ | | $\alpha=1°$ | |
|---|---|---|---|---|---|---|
| | $0.6\mu$ | $10.6\mu$ | $0.6\mu$ | $10.6\mu$ | $0.6\mu$ | $10.6\mu$ |
| 8 | $3\times10^{-4}$ | $10^{-6}$ | $5\times10^{-5}$ | $8\times10^{-10}$ | $2\times10^{-6}$ | $3\times10^{-1}$ |
| 27 | $3\times10^{-3}$ | $10^{-5}$ | $6\times10^{-4}$ | $8\times10^{-9}$ | $2\times10^{-5}$ | $3\times10^{-10}$ |
| 84 | $3\times10^{-1}$ | $10^{-4}$ | $6\times10^{-2}$ | $8\times10^{-8}$ | $3\times10^{-3}$ | $3\times10^{-9}$ | scattered light and that scattered within 5° and 1° of the specular direction are given. Based on this theory it should be possible at a wavelength of $10.6\mu$ to obtain scattering levels near specular of the order of one part in a billion.

SUMMARY OF THE INVENTION

The present invention employs a cone reflector truncated by a surface whose roughness is to be tested. A collimated light source is reflected from the test surface onto a spherical mirror and to a photo multiplier. The cone reflector collects beams scattered at large angles. These beams scattered at large angles make the object for the mirror a virtual ring instead of a spot. The scattered light falls in a ring on the photo multiplier and may be blocked by an aperture. By using a cone reflector, both the total amount of scattered light and the angular dependence of scattered light may be determined. A blocking mask may be used to stop the specular beam from striking the detector.

Another device for determining the roughness of an optic surface employs a laser beam which passes through a hole in a Coblentz sphere and strikes the test surface. Specularly reflected light passes back through the hole in the sphere and falls on a pyroelectric detector. Light scattered by the test surface will be collected by the Coblentz sphere and focused on another pyroelectric detector. Signals from the two pyroelectric detectors will be fed into a lock-in-amplifier, then to a voltage-to-frequency converter and then to a counter. The fraction to the reflected light which is scattered can thus be determined.

The present invention differs from the prior art in that:
1. cone reflectors collect beams scattered at large angles, permitting both total scattered and angular dependence of scattered light to be determined;
2. a diaphragm is included in the present invention to limit light scattered to smaller angles to the specular direction;
3. a blocking mask is used to stop the specular beam from striking the detector;

4. the present invention utilizes mirror optics rather than lens optics so that the wavelength range over which the instruments can be used is extended.

Unlike the prior art except for the U.S. Pat. to Benford No. 1,979,952, all of the scattered light can be collected with the present invention. The patent to Benford discloses a device which can be utilized over only a limited wavelength region.

With the present invention it is now possible to measure the total fraction of light scattered by a test surface as a function of wavelength over a range extending from the ultraviolet to the intermediate infrared regions of the spectrum. In addition with the present invention the angular dependence of scattered light can also be determined by employing a cone reflector.

DESCRIPTION OF THE PREFERRED EMBODIMENT

Figure 1:
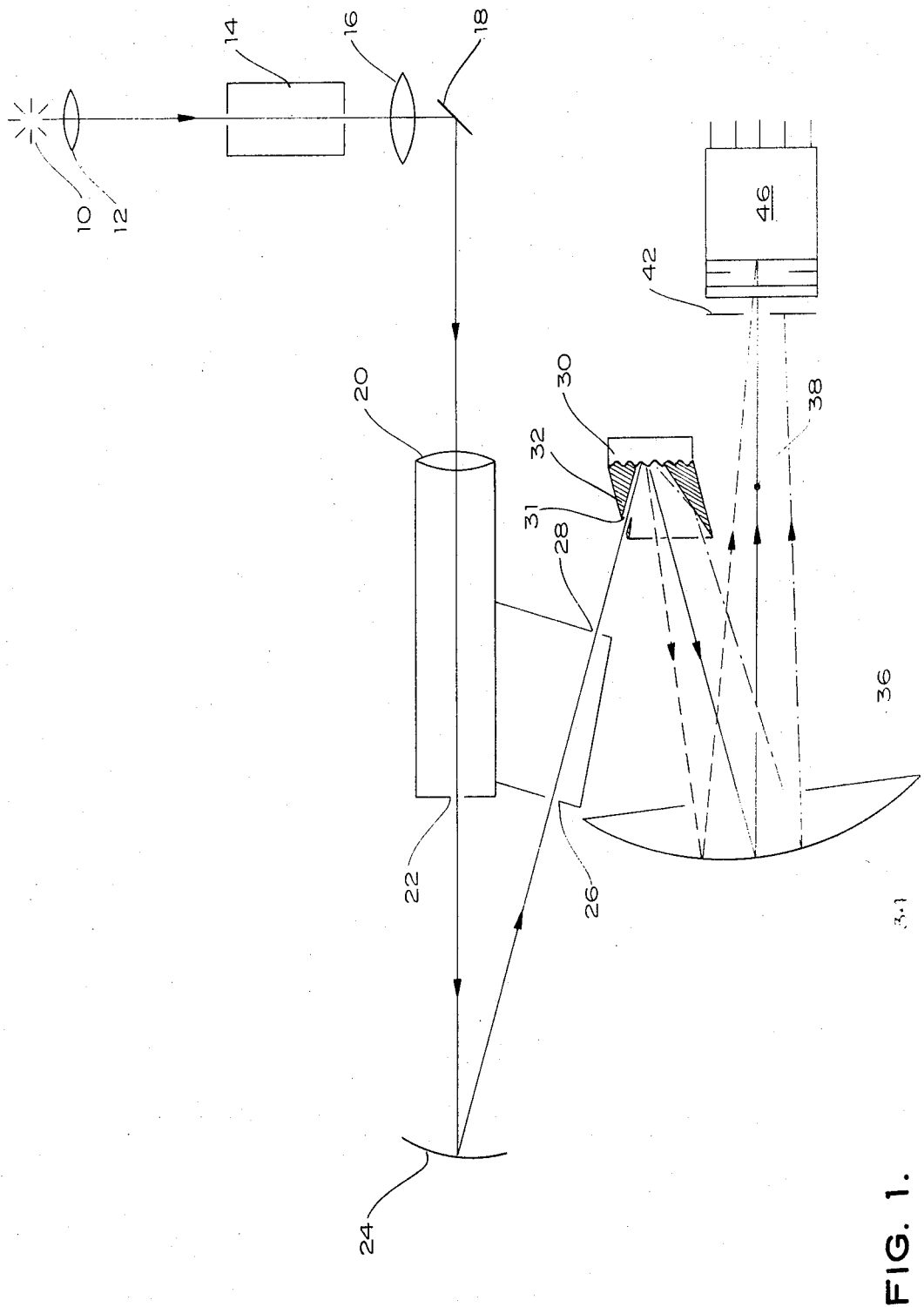
FIG. 1 is a schematic view of the invention employing a reflective cone.

A light source 10 provides a beam of light which passes through lens 12, monochronometer 14, lens 16 and is reflected from mirror 18. The beam then travels through lens 20 and passes through pinhole aperture 22 and is collimated by mirror 24. The collimated light beam passes through aperture 26, baffle 28 and hole 31 in the side of cone 32 striking test surface 30.

A truncated reflecting cone of angle $\alpha$ with its truncated end adjacent the test surface serves to redirect light scattered at angles greater than angle $\alpha$ and redirect it to spherical mirror 34. Also the specularly reflected light is reflected to mirror 34. The specularly reflected light images as a point on blocking mask 38 while the light scattered forms a circle around mask 38. The light beams are then imaged on photo multiplier 46.

Light scattered at angles between 37' semiangle and 20° misses blocking mask 38 and is imaged by mirror 34 onto photo multiplier 46. The acceptance semiangle can be varied from 1 ½° to 20° by adjusting diaphragm 36. Light scattered at angles greater than 20° strikes the cone which redirects it to mirror 34. Since the cone makes the object for mirror 34 a virtual ring instead of a spot, the scattered light falls in a ring on photo multiplier 46 and may be intercepted by diaphragm 42.

By adjusting diaphragm 42, diaphragm 36 and blocking mask 38 one can determine the total scattered light ratio and the fraction of light scattered into various angles near the specular direction.

Figure 2:
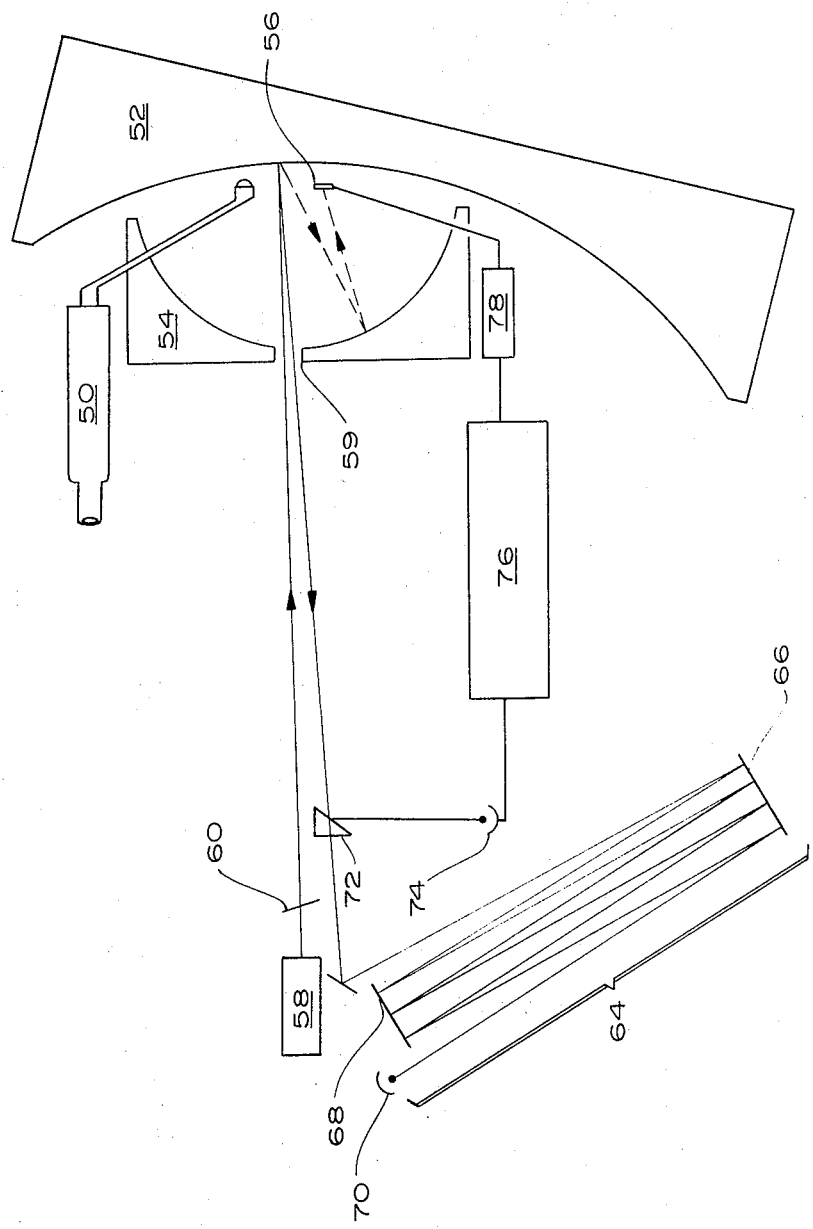
FIG. 2 is a schematic view of a roughness analyzer employing a pair of pyroelectric detectors.

Another device to measure the total amount of scattered light and its angular dependence on mirrors is shown schematically in FIG. 2. The device will be entirely enclosed and will be flushed with clean dry nitrogen or other gas to reduce scattering from dust particles. A laser 58 provides a light beam which passes through a hole 59 in Coblentz sphere 54. The light beam strikes the test surface of mirror 52 whose distance from hole 59 has been determined by using a fiber optic microprobe and whose tilt has been adjusted by using angle sensors 64 which consists of mirror 66, 68 and thermister detector 70.

Specularly reflected light passes back through hole 59 in sphere 54 is intercepted by an uncoated quartz prism 72 and falls on pyroelectric detector 74. Light scattered by the mirror will be collected by Coblentz sphere 54 and focused on pyroelectric detector 56. The window of pyroelectric detector 56 is of low index such as BaF and will be in the form of a dome. The detector surface itself is black so that the angular dependence of the detector will be reduced to a minimum.

The signal from detector 56 is fed to preamp 78 and this signal along with the signal from pyroelectric detector 74 is fed to a lock-in-amplifier, to a voltage-to-frequency converter and lastly to a counter. $R/R_o$ can then be determined.

What is claimed is:

1. A device for measuring the roughness of an optical surface comprising:
   a light source;
   means directing said source onto a surface to be tested, and
   means for determining the ratio of scattered light to total light reflected from said surface comprising:
   a truncated cone reflector to be placed with the truncated portion adjacent a surface whose roughness is to be tested;
   a spherical mirror;
   a diaphragm;
   a transducer for transforming light energy to electrical energy;
   said cone reflector being so positioned with respect to said mirror,
   that light scattered from said test surface is reflected from said cone reflector onto said mirror where it images as a circle;
   light specularly reflected from said test surface images as a point within said circle; and
   said diaphragm is so positioned with respect to said mirror and said transducer that said circular image may be prevented from reaching said transducer;
   whereby the rms roughness and the autocovariance length of the surface can be determined from the formula $$\frac{R}{R_0} = e^{-(4\pi\delta/\lambda)^2} + [1 - e^{-(4\pi\delta/\lambda)^2}][1 - e^{-(\pi\alpha a/\lambda)^2}]$$

2. A device for measuring the roughness of an optical surface comprising:
   a light source;
   means directing said source onto a surface to be tested;
   means for determining the ratio of scattered light to total light reflected from said surface comprising:
   a Coblentz sphere with a hole in the back;
   first and second pyroelectric detectors;
   means for comparing signals from said first and second detectors; and
   said sphere and first and second detectors being so positioned with respect to each other and to said test surface that specularly reflected light will pass back through said hole in said sphere and land on said first pyroelectric detector and scattered light will be reflected from said sphere onto said second pyroelectric detector;
   whereby the rms roughness and the autocovariance length of the surface can be determined from the formula $$\frac{R}{R_0} = e^{-(4\pi\delta/\lambda)^2} + [1 - e^{-(4\pi\delta/\lambda)^2}][1 - e^{-(\pi\alpha a/\lambda)^2}]$$

* * * * *